(12) United States Patent
Ferman (10) Patent No.: US 8,226,349 B2
(45) Date of Patent: Jul. 24, 2012

(54) DELTA BLADE PROPELLER APPARATUS

(76) Inventor: Marty A. Ferman, St. Louis, MO (US)

( * ) Notice: Subject to any disclaimer, the term of this patent is extended or adjusted under 35 U.S.C. 154(b) by 1030 days.

(21) Appl. No.: 12/181,289

(22) Filed: Jul. 28, 2008

(65) Prior Publication Data

US 2009/0035133 A1 Feb. 5, 2009

Related U.S. Application Data

(60) Provisional application No. 60/952,261, filed on Jul. 27, 2007.

(51) Int. Cl.
*F03D 7/02* (2006.01)
(52) U.S. Cl. .......................................... 415/4.3; 416/226
(58) Field of Classification Search .................... 415/4.3, 415/4.5; 416/226, 194–195, 196 R, 196 A
See application file for complete search history.

(56) References Cited

U.S. PATENT DOCUMENTS 7,131,611 B2 11/2006 Ferman

FOREIGN PATENT DOCUMENTS

DE EP0064742 A2 * 11/1982

OTHER PUBLICATIONS

Aguilar and Ferman, "Experimental and Analytical Studies of a Rhomboid Wing Flutter Model," EAA Air Venture 2004, Oshkosh, WI, Jul. 27-Aug. 2, 2004.
Ayala and Ferman, "Experimental Studies of a Two Degree of Freedom Propeller Whirl Flutter Model," EAA Air Venture 2004, Oshkosh WI, Jul. 27-Aug. 2, 2004.
Bagwill and Selberg, "Aerodynamic investigation of joined wing configurations for transport aircraft," AIAA, 1996, pp. 30-41.
Bagwill, "Aerodynamic Investigation of Joined Wing Configurations for Transport Aircraft", M.S. Thesis Research T7068, University of Missouri-Rolla, May 1995.
Barrio and Ferman, "Evaluation of New Propeller Concepts for Wind Turbines," EAA Air Venture 2005, Oshkosh WI, Jul. 25-31, 2005.
Blair and Canfield, "A Joined-Wing Structural Weight Modeling Study", AIAA paper 2002-1337, 43rd AIAA/ASME/ASCE/AHS/ASC Structures, Structural Dynamics, and Materials Conference, Apr. 22-25, 2002, Denver, Colorado.
Blair et al., "System Design Innovation Using Multidisciplinary Optimization and Simulation," Release Pending.
Burkhalter et al., "Downwash for Joined-Wing Airframe with Control Surface Deflections," Journal of Aircraft, vol. 29, No. 3, pp. 458-464, May-Jun. 1992.
Cesnik and Brown, "Active Warping Control of Joined-Wing Airplane Configuration", AIAA paper copyright 2003.

(Continued)

*Primary Examiner* — Kiesha Bryant
*Assistant Examiner* — Ali Naraghi
(74) *Attorney, Agent, or Firm* — Marcellus A. Chase; Kutak Rock LLP (57) ABSTRACT

A method of using a delta shaped blade as an aircraft propeller, helicopter or autogiro rotor, or wind turbine propeller is presented. The invention combines the delta blade system with the use of torsion bars to achieve desirable control of blade twist. The invention uses blade twist to control the air loading on the craft; hence better control of maneuvering is achieved. The invention also optionally includes adjustable blade roots such that the sweep and aspect ratio of the delta blade is controllably variable. Compared to traditional propeller blade configurations, the invention boasts improved performance and enhanced aeroelastic properties. The invention is a far more efficient system providing economic advantages, higher speeds, and more durable designs.

14 Claims, 7 Drawing Sheets

OTHER PUBLICATIONS

Ferman and Aguilar, "Experimental and Analytical Flutter Studies of a Rhomboid Wing Flutter Model," 9th International Conference on Recent Advances in Structural Dynamics, ISVR, University of Southampton, Southampton, UK Jul. 17-19, 2006.

Ferman and Haudrich, "Status Report on Research on Rhomboid Wings: Part I—Water Tunnel Studies," Parks College Report, Feb. 16, 2001.

Ferman, "A Concept for a Variable Geometry Rhomboid Wing Design," 8th International Conference on Recent Advances in Structural Dynamics, University of Southampton, ISVR, Southampton, UK, Jul. 14-16, 2003.

Ferman, "A fluttering airfoil for use as a wind energy generator," EAA Air Venture, Jul. 28-Aug. 3, 2008, Oshkosh, WI.

Ferman, "A New Concept for Smart Structures as Applied to Aeroelastic Tailoring of Aircraft lifting Surfaces," ASEE Conference, Sinclair College, Dayton, Ohio, Apr. 10-12, 1997.

Ferman, "Aeroelastic Tailoring of Aircraft Lifting Surfaces Using a New Smart Structures Concept", Sixth International Conference on Recent Advances in Structural Dynamics, University of Southampton, ISVR, Southampton, UK, Jul. 14-17, 1997.

Weisshaar and Lee, "Aeroelastic Tailoring of Joined-Wing Configurations", AIAA paper 2002-1207, 43rd AIAA/ASME/ASCE/AHS/ASC Structures, Structural Dynamics, and Materials Conference, Apr. 22-25, 2002, Denver, Colorado.

Ferman, "Use of Torsion Bars for Control of Twist, Air Loads, and Aeroelasticity of Fixed and Variable Geometry Rhomboid Wings," 9th International Conference on Recent Advances in Structural Dynamics, University of Southampton, ISVR, Southampton, UK, Jul. 17-19, 2006.

Ferman, "Use of Torsion Bars for Twist, Air Loads, and Control of Fixed and Variable Geometry Rhomboid Wings," EAA Air Venture 2004, Oshkosh, WI, Jul. 27-Aug. 2, 2004.

Ferman, and Haudrich, D.P., "Water Tunnel Studies of Tip Vortices, Flow Angularities, and Trailing Vortices of a Rhomboid Wing Design," EAA Air Venture 2001, Osh Kosh, WI, Jul. 24-30, 2001.

Ferman, and Mugica, "A Variable Geometry Rhomboid Wing Design Concept," EAA Air Venture 2003, Osh Kosh, WI, Jul. 29-Aug. 4, 2003.

Gallman and Smith, "Optimization of Joined Wing Aircraft," Journal of Aircraft, vol. 30, No. 6, pp. 897-905, Nov.-Dec. 1993.

Kroo and Gallman, "Aerodynamic and Structural Studies of Joined-Wing Aircraft," Journal of Aircraft, vol. 28, No. 1, pp. 74-81, Jan. 1991.

Livne, "Aeroelasticity of Joined-Wing Airplane Configurations: Past Work and Future Challenges—A Survey", AIAA-2001-1370, 42nd AIAA / ASME / ASCE/AHS/ASC Structures, Structural Dynamics, and Material Conference, Seattle, WA, Apr. 16-19, 2001.

Nangia et al., "Unconventional High Aspect Ratio Joined-Wing Aircraft with Aft- &Forward-Swept Wing-Tips", AIAA-2003-0605, 41st AIAA Aerospace Science Meeting & Exhibit, Jan. 6-9, 2003, Reno, Nevada, USA.

Patil, "Nonlinear Aeroelastic Analysis of Joined-Wing Aircraft", AIAA paper, copyright 2003.

Poladian and Reinhard, "High Altitude Reconnaissance Aircraft Design," AIAA-89-2 109, AIAA/AHS/ASEE Aircraft, Design, Systems and Operations Conference, Seattle, WA, Jul. 1989.

Rallabhandi et al., "An Improved Procedure for Prediction of Drag Polars of a Joined Wing Concept Using Physics-Based Response Surface Methodology", SAE paper 2001-01-3015.

Reich et al., "Application of Active Aeroelastic Wing Technology to a Joined-Wing Sensorcraft", AIAA paper 2002-1633, ASC Structures, Structural Dynamics, and Materials Conference, Apr. 22-25, 2002, Denver, Colorado.

Roberts, Jr. et al., "Sensor-Craft Structural Optimization and Analytical Certification", 44thAIAA/ASME/ASCE/AHS Structures, Structural Dynamics, and Material Conference, Apr. 7-11, 2003, Norfolk, Virginia.

Schefter, "Diamonds are a Plane's Best Friend", Popular Science Magazine, Jan. 1986.

Selberg and Cronin, "Aerodynamic-Structural Optimization of Positive/Negative Stagger Joined Wing Configurations", AIAA-86-2626, AIAA/AHS/ASEE Aircraft Systems, Design and Technology Meeting, Dayton, Ohio Oct. 1986.

TRIFU and SAVU, "Unmanned Solar-Powered Aerial Surveyor Configured With an Aerodynamic Optimization Procedure", AIAA-97-2322, AIAA 5th Applied Aerodynamics Conference, Atlanta, GA Jun. 1997.

* cited by examiner

V - WIND SPEED
β - WIND AZIMUTH
ω - ROTATIONAL FREQUENCY
T - TORQUE
E - VOLTAGE
I - CURRENT
KG - TRANSFER FUNCTION

DELTA BLADE PROPELLER APPARATUS

CROSS-REFERENCE TO RELATED APPLICATIONS

This application claims priority pursuant to 35 U.S.C. 119(e) to U.S. Provisional Patent Application Ser. No. 60/952,261, filed Jul. 27, 2007, the entire disclosure of which is incorporated herein by reference.

FIELD OF THE INVENTION

The invention relates generally to a rotor for helicopters and autogiros, a propeller for aircraft propulsion or a propeller for power generation in a turbine or windmill, and relates specifically to a propeller with delta-shaped blades, capable of having pitch adjusted by torsion bars, and optionally of variable sweep and aspect ratio.

BACKGROUND OF THE INVENTION

Rhomboid-shaped wings are known in the art (see Ref (1-4)). The rhomboid wing gets its name from the diamond shape formed by the wings on both sides of an aircraft fuselage. These are excellent examples of designs with unique aero-structural features that have the ability to match mission requirements, and provide superior flight performance. These studies show some unique capabilities of the rhomboid wing, specifically superior aeroelastic properties.

Many efforts have been made with good results to support these thoughts, Ref (5-26). Efforts began at Saint Louis University—Parks College with water tunnel studies of a rhomboid wing to acquire flow visualization data for a proposal to AFRL. The Parks data showed interesting results suggesting that a flow reversal might occur at high angles of attack, Ref (27-29). A MS Thesis followed to study the flows more closely. That work, Ref (30), showed no flow reversal, and indicated no stall to a much higher angle of attack than did the prior work. Another MS thesis, Ref (31), evaluated the buffet properties of a more complete model where the rhomboid wing was mated to a stylized fighter type of fuselage. That study showed no stall to 55 degrees, and a much more muted vortex flow than found on the F-15 and F/A-18 fighters. While the thesis was still pending, a paper, Ref (32), was published. Next, the applicant embarked on work with Variable Geometry Rhomboid Wings, Ref (33-34).

In addition to the Rhomboid wing design, the Applicant worked in parallel with the use of torsion bars in straight wings for control of wing twist. This provided a means to alter the loads on the wings, thus controlling maneuvering. The applicant made the surprising discovery that the torsion bar wing-warping technique enhanced the ability to control aeroelasticity to adjust lift to drag ratio, control flutter and gust and buffet response, Ref (35-37). Because of the synergism of the rhomboid wings and wings with torsion bars, the applicant merged those two ideas, and was issued a US patent, Ref (40) (see also Ref (38-39)). The aeroelastic and flutter properties of the rhomboid wing design were extensively studied, Ref (41-43).

The applicant also has extensive experience with windmills and propellers (see Ref (44-48)). The applicant concluded that current wind turbine and aircraft propulsion propeller blade models often have some serious disadvantages. For example, in helicopters and propeller aircraft, the rotors and propellers must rotate at a very high rotational speed in order to produce sufficient lift and thrust. These high rotational speeds result in greater vibrational forces. Wind turbines have similar problems with vibrational forces because of the high wind speeds needed to turn the blades. These high rotational speeds also result in a great amount of noise. A second problem with the current propeller blade models is the fragile nature of the blade designs. Current blades are long and slender and vulnerable to damage from foreign objects (e.g. gunfire).

The applicant made the surprising discovery that the rhomboid wing design could be employed as a propeller blade to fill a long-felt and unmet need in the art of propellers and rotors.

SUMMARY OF THE INVENTION

The present invention relates to a concept for using the rhomboid wing as a propeller or rotor. The invention can be employed in (a) conventional propeller aircraft, (b) helicopters and autogiros, and (c) wind turbines and windmills. A rhomboid wing, as used in a propeller application, actually requires only one half (one side of the fuselage) of the traditional rhomboid wing design. Therefore, throughout this application, the applicant refers to the unique blade configuration of this invention as a delta blade system.

The invention combines use of torsion bars to achieve desirable control of wing twist, with the delta blade system, in a propeller application. It uses wing twist to control the air loading on the craft; hence better control of maneuvering is achieved. It also provides all of the advantages of variable geometry wings. Compared to traditional propeller blade configurations, the invention boasts improved performance and enhanced aeroelastic properties. The invention is a far more efficient system providing economic advantages, higher speeds, and more durable designs.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWING

A preferred embodiment of the invention, illustrative of the best mode in which the applicant has contemplated applying the principles, is set forth in the following description and is shown in the drawings and is particularly and distinctly pointed out and set forth in the appended claims.

DETAILED DESCRIPTION OF THE INVENTION

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The invention is an improved propeller blade design. It is comprised of a central hub and a plurality of delta blade systems. The hub rotates about an axis. The delta blade systems extend outward radially away from the hub in a plane perpendicular to the hub's axis of rotation. The invention can incorporate any number of delta blade systems, preferably two or three. Each delta blade system is spaced equidistant from the adjacent delta blade systems.

Each delta blade system is comprised of a leading blade, a trailing blade, a spherical joint and a torsion bar system. The tip of the leading blade is connected to the tip of the trailing blade via the spherical joint. The spherical joint is connected to the hub via a torsion bar system.

Figure 4:
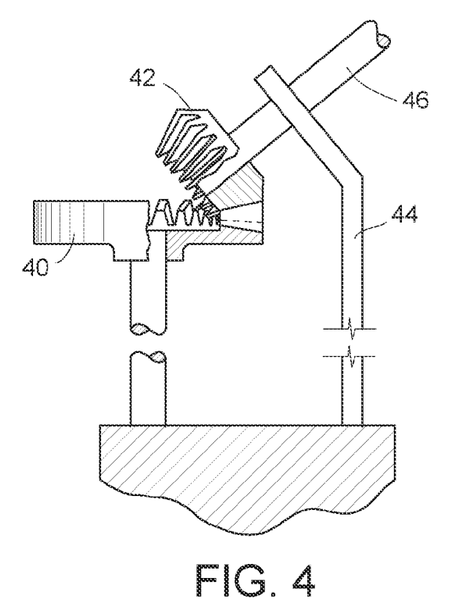
FIG. 4 depicts one manner of connecting the torsion bar system to the hub, utilizing a crown gear, a bevel gear and a bevel gear support.
Figure 5:
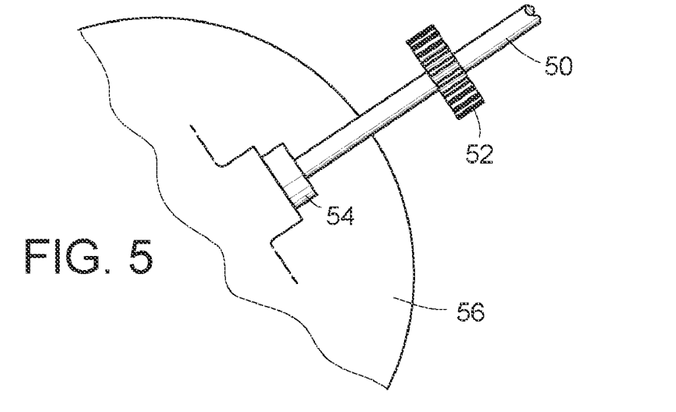
FIG. 5 depicts an alternative manner of connecting the torsion bar system to the hub, utilizing a gear and bearing.

The roots of the leading blade and the trailing blade are connected to the hub. Throughout this specification and claims, the terms "root" and "proximal end" are used interchangeably. The root of each blade is connected to the hub by any means now known or hereinafter discovered. For example, and not by way of limitation, in one embodiment the root is connected to the hub with a ball joint or universal joint. FIGS. 4 and 5 show two other alternative embodiments. FIG. 4 shows a torsion bar (46) within either the leading blade or the trailing blade connected to the hub via a crown gear (40), a bevel gear (42), and bevel gear support (44). In FIG. 5, the torsion bar (50) is connected to the hub (56) with a gear (52) and bearing (54). One skilled in the art will appreciate that the roots of the blades can be connected to the hub in many different configurations.

Figure 1:
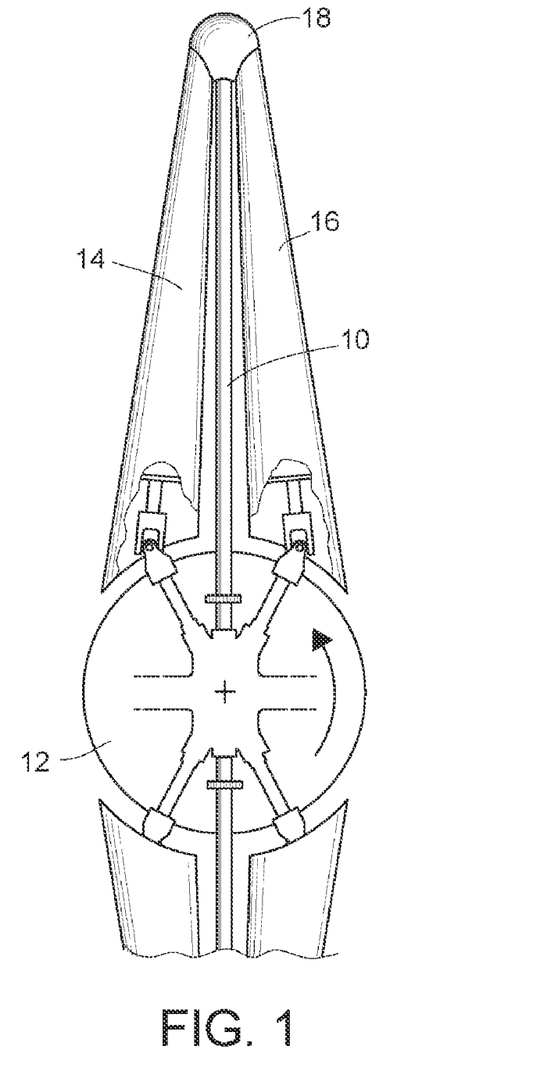
FIG. 1 depicts one side of a two delta blade system propeller of the instant invention. This drawing shows a single torsion bar extending from the hub at the root to the spherical joint at the tip.

The torsion bar system comprises a minimum of one torsion bar, preferably a plurality of torsion bars. FIG. 1 depicts the invention with a single torsion bar system with the torsion bar (10) extending from the hub (12) to the spherical joint (18). Although FIG. 1 depicts the single torsion bar system with the torsion bar (10) external to both the leading blade (14) and the trailing blade (16), the single torsion bar (10) could alternatively be located within either the leading blade (14) or the trailing blade (16).

Figure 2:
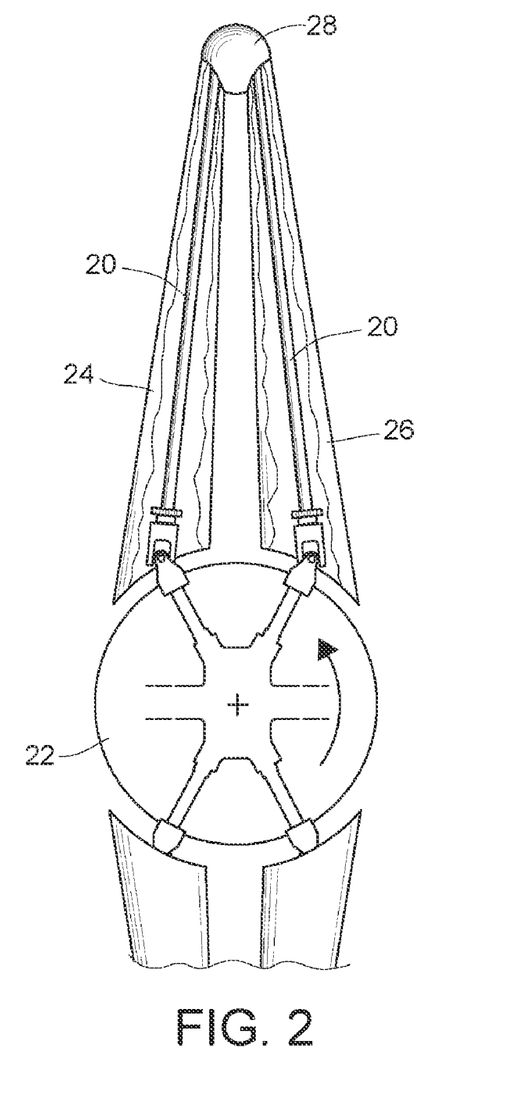
FIG. 2 depicts one side of a two delta blade system propeller of the instant invention. This drawing shows a torsion bar in each of the leading blade and the trailing blade.
Figure 3:
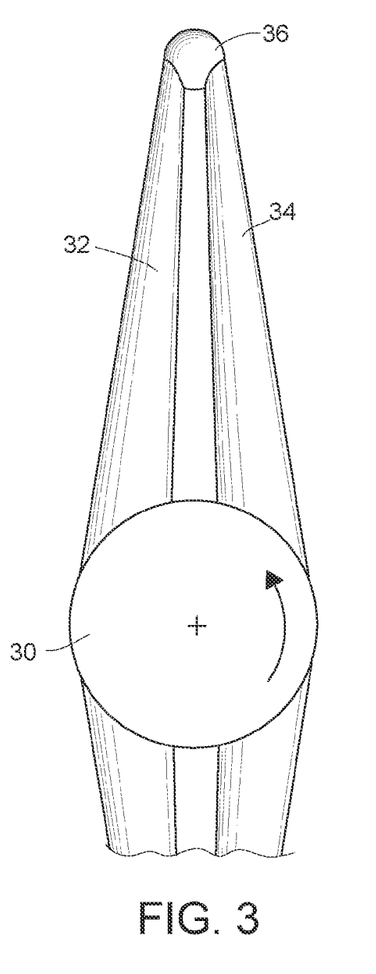
FIG. 3 depicts one side of a two delta blade system propeller of the instant invention. The torsion bar or bars are not visible in this drawing.

The torsion bar system may comprise several torsion bars. FIG. 2 shows a torsion bar system with two torsion bars (20). In FIG. 2, the two torsion bars (20) extend from the hub (22) to the spherical joint (28); one along the leading blade (24) and the other along the trailing blade (26). In FIG. 3, the torsion bar system is not visible from the exterior of the delta blade system, although the hub (30), leading blade (32), trailing blade (34) and spherical joint (36) are shown.

Figure 10:
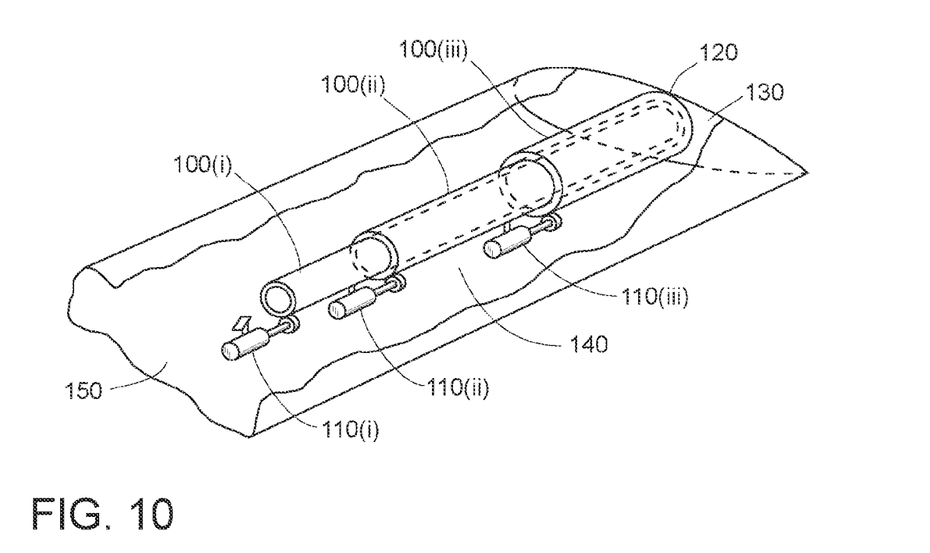
FIG. 10 concentric torsion bars with servo-motors within a blade.

In one embodiment of the invention, shown in FIG. 10, a plurality of torsion bars (100) of the torsion bar system are configured concentrically. The concentrically configured torsion bars (100) run along a blade (140) from tip (120) to root (150). In various embodiments of this concentrically configured torsion bar system, the torsion bars (100) run along the leading blade, along the trailing blade, along both, or along neither (e.g. external to both the leading blade and the trailing blade as in FIG. 1). A servo motor (110($n$)) applies a torque to each torsion bar (100($n$)). The blade (140) includes a rib (130) at any point along the length of the blade where additional or differential torque is desired.

Figure 11A:
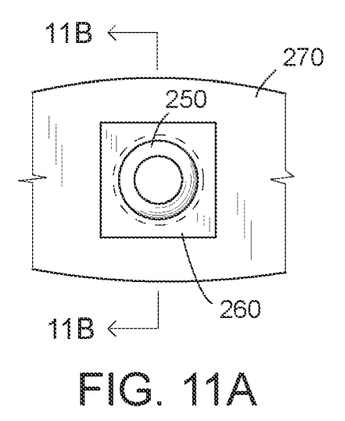
FIG. 11 depicts a spherical bearing as used in a variable geometry delta blade with leading blade, trailing blade, torsion bars, ribs and ribs with a spherical joint at the blade tip.
Figure 11B:
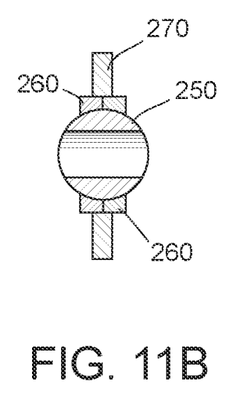
Figure 11C:
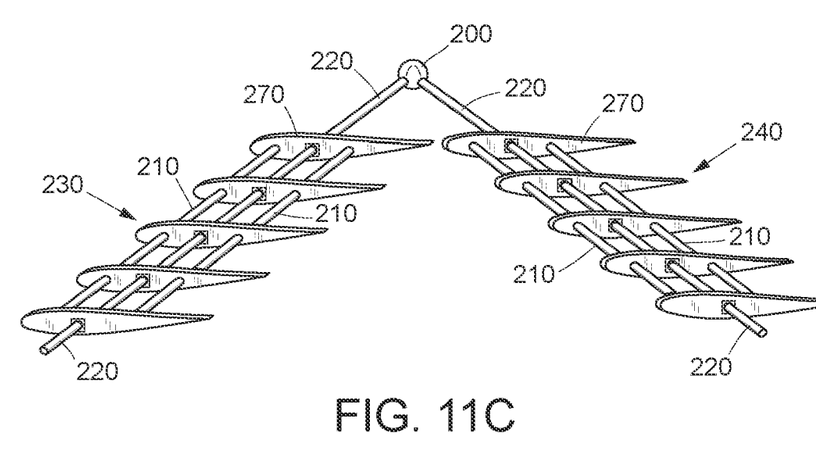

In another embodiment of the invention, shown in FIG. 11, the torsion bar system further comprises a spherical bearing (250). FIG. 11 shows the spherical bearing (250) from the side (250($i$)) and front (250($ii$)). The spherical bearing (250) is mounted in a rib (270) via a bearing mount (260). In some cases, the invention includes long torsion bars (220) that extend from the hub to the spherical joint (200). A spherical bearing (250) (or multiple spherical bearings) located along the length of the long torsion bar (220) reduces binding of the torsion bar system. A torsion bar (220) with a spherical bearing (250) can extend in a non-linear path from hub to spherical joint (200). Because of this, a torsion bar (220) with a spherical bearing (250) (or multiple spherical bearings) is used in situations where a linear torsion bar is impractical or impossible.

The delta blade system of FIG. 11 includes a leading blade (230) and a trailing blade (240) connected to the hub at the root and to each other at the tip, via a spherical joint (200). Each blade further includes several ribs (270) and two additional spars (210) that run parallel to the torsion bar (220). Each rib (270) includes a spherical bearing (250) to prevent binding and aid in torsion rigidity.

When the spars (210) deflect together, blade-bending results. When the spars (210) deflect differentially, torsion results. The torsion bar (220) is a third spar. Together, the torsion bars, spars and ribs can selectively provide torsion or bending of the blade.

A torque is applied to one end of the torsion bar system. In a single torsion bar system, a single torque is applied to the root end of the torsion bar. The torque applied at the root of the torsion bar twists the spherical joint at the tip. As the spherical joint twists, the tip of the leading blade (or the tip of the trailing blade or both) twists. As the tip of the leading blade (or the tip of the trailing blade or both) twists, the angle of attack varies. Thus, by controlling torque applied at the root of the torsion bar system, one can control the angle of attack of the leading blade (or the trailing blade or both). In a torsion bar system with more than one torsion bar, a torque is applied at the root of each torsion bar. The torque or each torque is applied by a servo motor, a hydraulic actuator, any other means for applying a torque to a torsion bar, or some combination thereof. As shown in FIG. 10, a servo motor (110($n$)) is located at the root of each torsion bar (100($n$)).

For example and not by way of limitation, a torsion bar system of one embodiment includes multiple torsion bars configured concentrically in both the leading blade and the trailing blade. A torque is applied at the root of each of the torsion bars. In this embodiment, the leading blade and the trailing blade further include a plurality of ribs located at specific points along their respective lengths, as shown in FIG. 11. Each of the ribs is connected to a respective one of the concentrically configured torsion bars as shown in FIG. 10. Each torque applied at the root of a different torsion bar controls the angle of attack of one of the leading blade or the trailing blade at a specific point along its length, where the torsion bar connects to a rib. By varying the angles of attack of the two blades at different points along the length, one can experience significantly improved performance, efficiency, and flight control compared to currently employed propeller models.

Figure 6:
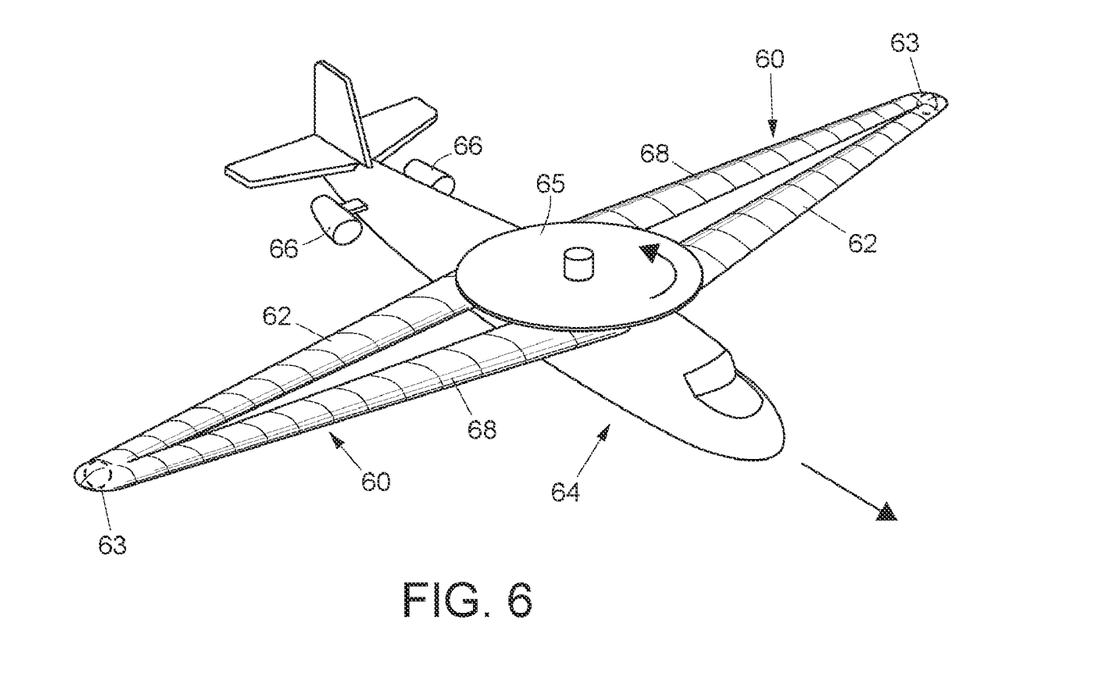
FIG. 6 depicts a two delta blade system propeller of the instant invention as used on a helicopter.

FIG. 6 shows a delta blade configuration of an embodiment of the instant invention. In one embodiment of the configuration shown in FIG. 6, two delta blades (60) are used as rotors on a helicopter vehicle (64). As shown in FIG. 6, the helicopter vehicle (64) includes two delta blades (60) arrayed opposite each other and connected to a central rotating hub (65). Each delta blade (60) includes a leading blade (62) and a trailing blade (68) connected to the hub (65) at the root and to each other at the tip, via a spherical joint (63). The helicopter vehicle (64) includes Jet-Thrust for anti-torque control (66).

Figure 7:
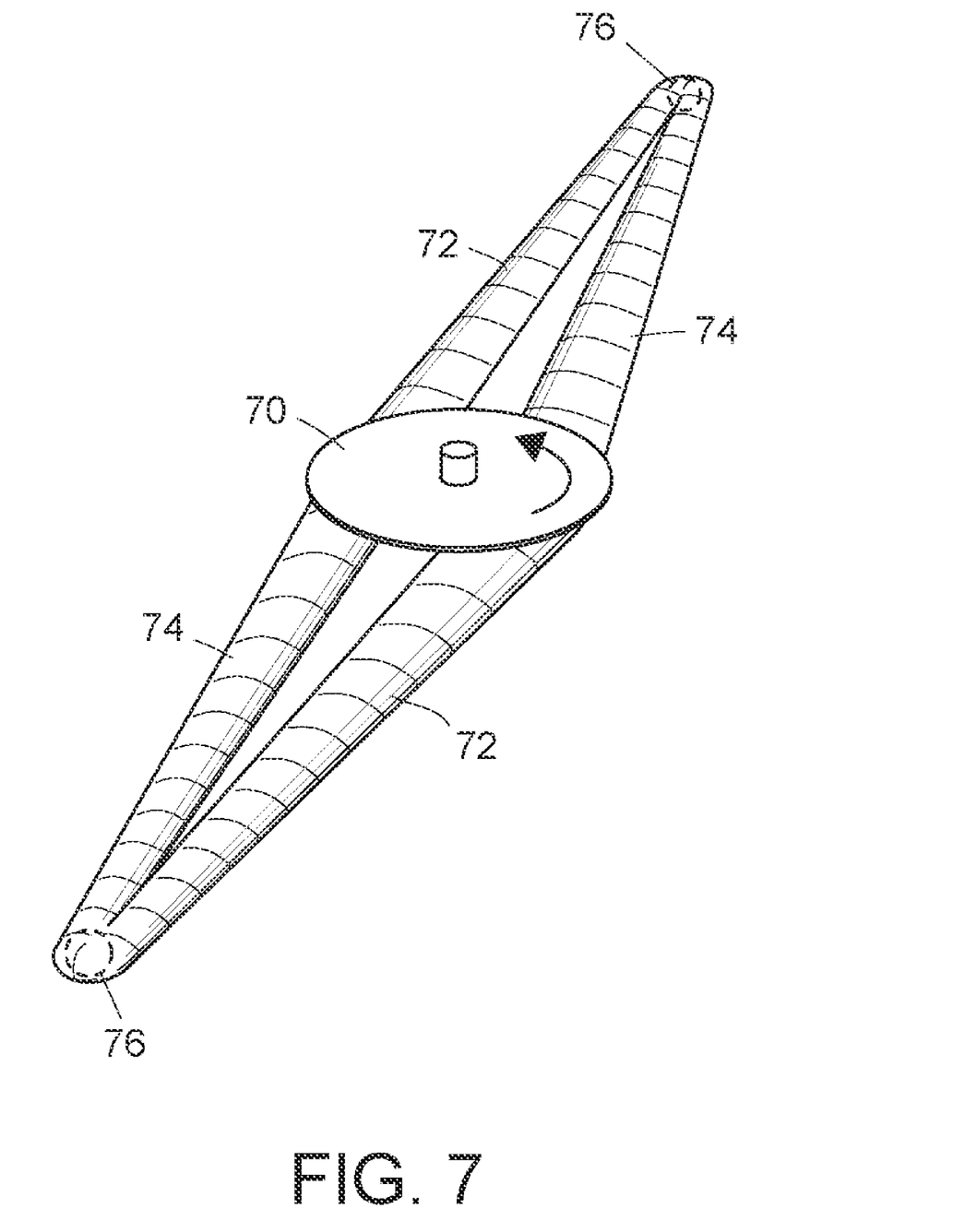
FIG. 7 depicts the two delta blade system of FIG. 6 with the helicopter vehicle removed.

In FIG. 7, the blades of the helicopter vehicle are shown removed from the vehicle. Each delta blade includes a leading blade (72) and a trailing blade (74) connected to the hub (70) at the root and to each other at the tip, via a spherical joint (76). The delta blades may also be used on Autogiros and, in a smaller version, as a propeller or propellers on a propeller aircraft.

Figure 8A:
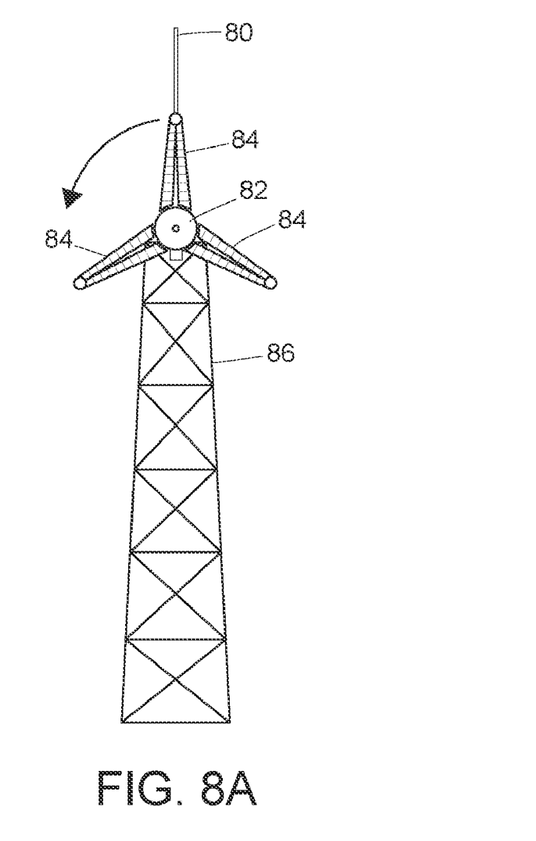
FIG. 8 depicts a three delta blade system propeller of the instant invention as used in a wind turbine, electricity generation, application.
Figure 8B:
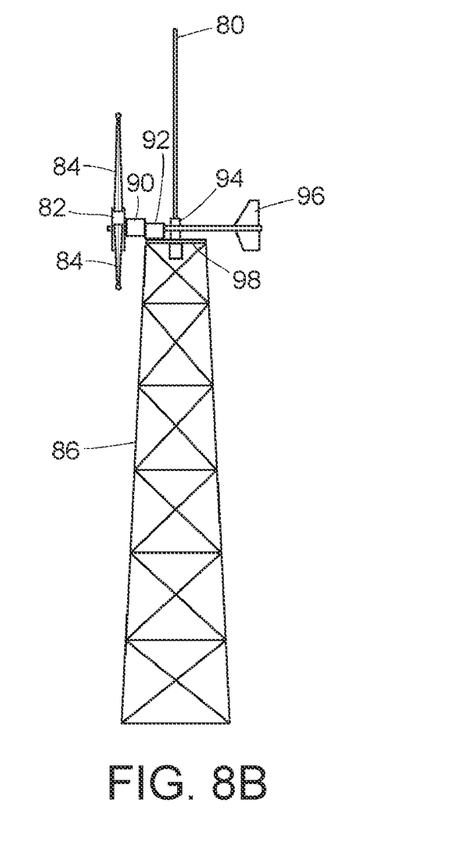
Figure 8C:
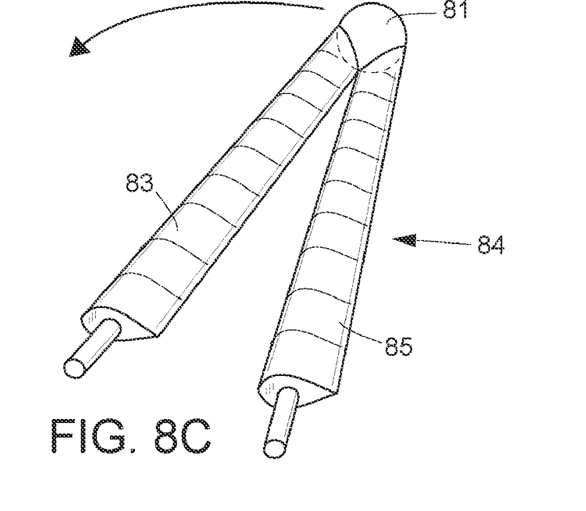

FIG. 8 depicts the delta blade configuration of an embodiment of the instant invention as used in a wind turbine (or windmill) application. In FIG. 8, the invention employs three delta blade systems (84) connected to a central hub (82). Each of the three delta blades (84) are equidistant from the other two. Each of the three delta blades includes a leading blade (83) and a trailing blade (85) connected to the hub (82) at the root and to the other at the tip, via a spherical joint (81). The wind mill shown in FIG. 8 is erected on a four-legged tower (86) with a top plate (98) of the tower. The wind mill includes a transmission (90), generator (92), pivot (94), weather vane (96) and a lightening rod (80).

Figure 9:
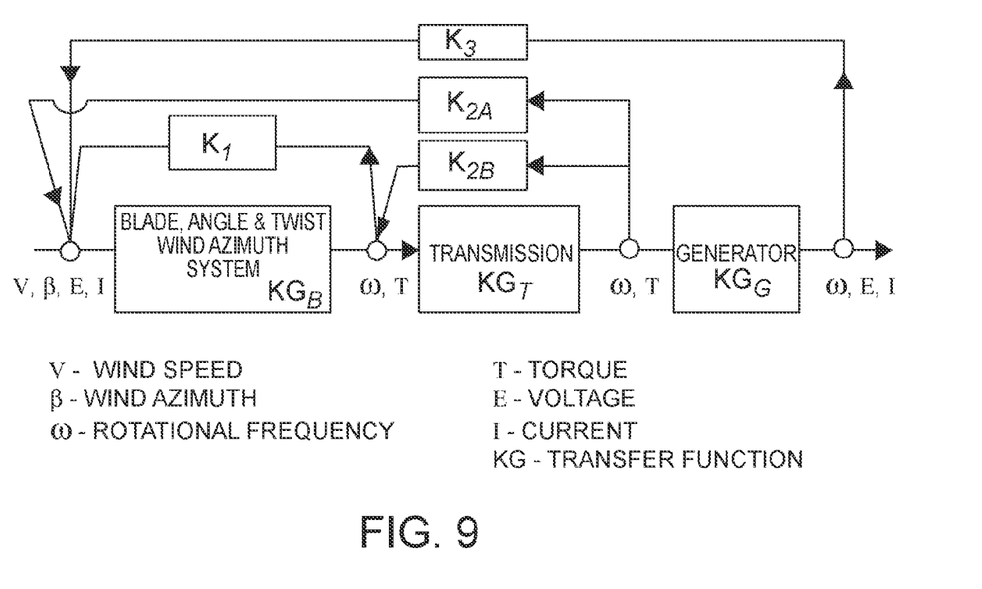
FIG. 9 depicts a control loop for a propeller of the instant invention. The control loop shows how blade angle and orientation with respect to fluid flow direction should be modified based on various inputs such as wind speed and rotational frequency.

FIG. 9 depicts a control loop for the wind turbine of FIG. 8. The angles of attack of the blades (leading or trailing or both) are controlled by torsion bar systems. The angles of attack are varied depending on a number of factors including wind speed and direction with respect to the axis of rotation of the hub and rotational frequency of the hub and blades. The transmission shown in FIG. 9 is optional, but preferred. The control loop shown in FIG. 9 is applicable to wind turbines and is shown to illustrate an example of a preferred control loop. A similar control loop would be applicable for aircraft propeller and helicopter or autogiro rotor applications of this invention, with the generator replaced with an engine.

In another embodiment of the instant invention, also not shown in the figures, the angle between the leading blade and the trailing blade is variable. The root end of the leading blade (or the trailing blade or both) can be moved to any position along an arc that is concentric with the perimeter of the hub. The arc of possible movement may be located within or external to the hub. An angle may be measured of the leading blade and a line tangential to the arc at the intersection of the leading blade and the arc. That angle is variable between 90 degrees and 180 degrees. In other embodiments, the same is true of the trailing blade and both the leading trailing blade and trailing blade. By controlling the variance of the location of the root of the leading blade (or the trailing blade or both), the sweep and aspect ratio of the delta blade system can be controlled and varied to improve performance, flight control and efficiency in different fluid dynamic conditions.

In another embodiment, the instant invention is a method of controlling the apparatus described herein. The method comprises the steps of applying a torque to the root end of each of the torsion bars of the torsion bar systems. The torque, or each torque, is applied as described above to control the angle of attack of the leading blade, the trailing blade or both. Each torque is preferably applied to control the angle of attack at a plurality of locations along each of the leading blade and the trailing blade, as described above. In another embodiment, a method of the instant invention further comprises the additional step of applying a lateral force to the root end of the leading blade (or trailing blade or both) such that the sweep and aspect ratio of the delta blade is controllably varied as described above.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

REFERENCES

The following references are cited by number throughout this disclosure. Applicant makes no statement, inferred or direct, regarding the status of these references as prior art. Applicant reserves the right to challenge the veracity of statements made in these references, all of which are incorporated herein by reference in their entireties.

1. Walkovitch, J., "The Joined Wing: An Overview." AIAA-85-0274, AIAA 23rd Aerospace Science Meeting, Reno, Nev., January 1985
2. Angelluci, A., "The Illustrated World Encyclopedia of Civil Air Craft," Chartwell Books, Inc, page 21, 2001 Edition
3. "New Directions for Early Warning Aircraft Platforms", Boeing News, Vol. 59, Oct. 27, 2000
4. Weisshaar, T. A., Lee, D. H., "Aeroelastic Tailoring of Joined-Wing Configurations", AIAA paper 2002-1207, 43rd AIAA/ASME/ASCE/AHS/ASC Structures, Structural Dynamics, and Materials Conference, 22-25 Apr. 2002, Denver, Colo.
5. Patil, M. J., "Nonlinear Aeroelastic Analysis of Joined-Wing Aircraft", AIAA paper, copyright 2003.
6. Roberts, Jr., R. W., Canfield, R. A. and Blair M., "Sensor-Craft Structural Optimization and Analytical Certification", 44th AIAA/ASME/ASCE/AHS Structures, Structural Dynamics, and Material Conference, 7-11 Apr. 2003, Norfolk, Va.
7. Nangia, R. K., Palmer, M. E., and Tilmann, C. P., "Unconventional High Aspect Ratio Joined-Wing Aircraft with Aft-&Forward-Swept Wing-Tips", AIAA-2003-0605, 41st AIAA Aerospace Science Meeting & Exhibit, 6-9 Jan. 2003, Reno, Nev., USA.
8. Scheffer, J., "Diamonds are a Plane's Best Friend", Popular Science Magazine, January, 1986
9. Livne, E., "Aeroelasticity of Joined-Wing Airplane Configurations: Past Work and Future Challenges—A Survey", AIAA-2001-1370, 42nd AIAA/ASME/ASCE/AHS/ASC Structures, Structural Dynamics, and Material Conference, Seattle, Wash., 16-19 Apr. 2001
10. Cesnik, C. E. S., Brown, E. L., "Active Warping Control of Joined-Wing Airplane Configuration", AIAA paper copyright 2003.
11. Rallabhandi, S. K., Cagatay, E., Mavris, D. N., "An Improved Procedure for Prediction of Drag Polars of a Joined Wing Concept Using Physics-Based Response Surface Methodology", SAE paper 2001-01-3015
12. Gallman, J. W., Kroo, I. M., "Structural Optimization for Joined-Wing Synthesis", AIAA paper 92-4761-CP
13. Wai, J. C., Herling, W. W., Muilenburg, D. A., "Analysis of Joined-Wing configuration", Copyright 1994© The Boeing Company.
14. Qu, B. Cutchins, M. A., "Joined-Wing Vibrations using Pc-Based Modal Testing and Finite Element Analysis", AIAA paper 92-2260-CP
15. Johnson, F. P., "Sensor Craft" Air Force Research Laboratory, 14 Feb. 2001
16. Nangia, R. K., Palmer, M. E., "Exploiting Unconventional Joined-Wing Concept for Subsonic High-Altitude Reconnaissance Aircraft", Paper 23 RTO AVT-099 Symposium, Novel and Emerging Vehicle and Vehicle Technology Concepts, 7-11 Apr. 2003, Brussels, Belgium
17. Blair, M., Canfield, R. A., "A Joined-Wing Structural Weight Modeling Study", AIAA paper 2002-1337, 43rd AIAA/ASME/ASCE/AHS/ASC Structures, Structural Dynamics, and Materials Conference, 22-25 Apr. 2002, Denver, Colo.
18. Reich, G. W., Raveh, D., Zink, P. S., "Application of Active Aeroelastic Wing Technology to a Joined-Wing Sensorcraft", AIAA paper 2002-1633, ASC Structures, Structural Dynamics, and Materials Conference, 22-25 Apr. 2002, Denver, Colo.
19. Bagwill, T. L., "Aerodynamic Investigation of Joined Wing Configurations for Transport Aircraft", M.S. Thesis Research T7068, University of Missouri-Rolla, May 1995
20. Selberg, B. P. and Cronin, D. L., "Aerodynamic-Structural Optimization of Positive/Negative Stagger Joined Wing Configurations", AIAA-86-2626, AIAA/AHS/ASEE Aircraft Systems, Design and Technology Meeting, Dayton, Ohio October 1986
21. Poladian, D. and Reinhard, D. J., "High Altitude Reconnaissance Aircraft Design," AIAA-89-2109, AIAA/AHS/ASEE Aircraft, Design, Systems and Operations Conference, Seattle, Wash., July 1989
22. Kroo, I., and Gallman, J., "Aerodynamic and Structural Studies of Joined-Wing Aircraft," Journal of Aircraft, Vol. 28, No. 1, pp. 74-81, January 1991
23. Burkhalter, J., Spring, D., and Key, M., "Downwash for Joined-Wing Airframe with Control Surface Deflections," Journal of Aircraft, Vol. 29, No. 3, pp. 458-464, May-June 1992
24. Gallman, J., and Smith, C., "Optimization of Joined Wing Aircraft," Journal of Aircraft, Vol. 30, No. 6, pp. 897-905, November-December 1993
25. Trifu, Octavian and Savu, George, "Unmanned Solar-Powered Aerial Surveyor Configured With an Aerodynamic Optimization Procedure", AIAA-97-2322, AIAA 5th Applied Aerodynamics Conference, Atlanta, Ga. June 1997
26. Blair, M., Moorehouse, D., and Weisshaar, T., "System Design Innovation Using Multidisciplinary Optimization and Simulation," Release Pending
27. Ferman, M. A., and Haudrich, D. "Status Report on Research on Rhomboid Wings: Part I—Water Tunnel Studies," Parks College Report, February 16th,
28. Ferman, M. A., and Haudrich, D. P., "Water Tunnel Studies of Tip Vortices, Flow Angularities, and Trailing Vortices of a Rhomboid Wing Design," EAA Air Venture 2001, Osh Kosh, Wis., 24-30 Jul. 2001
29. Haudrich, D. "Water Tunnel Studies of Tip Vortices and Flow Angularities of Joined Wing Structures" AIAA Student Paper Conference, Iowa State University, Ames, Iowa, April 2001
30. Lopez, E., "Water Tunnel and Wind Tunnel Studies of a Rhomboid Wing Design," MS Thesis, Parks College, St. Louis University, December 2002
31. Mugica, I., "Buffet Studies of a Rhomboid Wing Fighter Model," MS Thesis, Parks College, Saint Louis University, St. Louis, Mo., Release Pending
32. Mugica, I and Ferman, M., "Buffet Studies of a Rhomboid Wing Fighter Design," EAA Air Venture 2005, Osh Kosh, Wis. 25-31 Jul. 2005
33. Ferman, M. A., "A Concept for a Variable Geometry Rhomboid Wing Design," 8th International Conference on Recent Advances in Structural Dynamics, University of Southampton, ISVR, Southampton, UK, 14-16 Jul. 2003
34. Ferman, M. A., and Mugica, I., "A Variable Geometry Rhomboid Wing Design Concept," EAA Air Venture 2003, Osh Kosh, Wis., July 29-Aug. 4, 2003
35. Ferman, M. A. "A New Concept For Smart Structures As Applied to Aeroelastic Tailoring of Aircraft lifting Surfaces," ASEE Conference, Sinclair College, Dayton, Ohio, 10-12 April, 1997
36. Ferman, M. A. "Aeroelastic Tailoring Of Aircraft Lifting Surfaces Using A New Smart Structures Concept", Sixth International Conference on Recent Advances in Structural Dynamics, University of Southampton, ISVR, Southampton, UK, 14-17 Jul. 1997
37. Ferman, M. A., "A Modern Approach to Wing Warp for Aircraft Control," EAA Air Venture 1998, Osh Kosh, Wis., 29 Jul. to 4 Aug. 1998
38. Ferman, M. A., "Use of Torsion Bars for Twist, Air Loads, and Control of Fixed and Variable Geometry Rhomboid Wings," EAA Air Venture 2004, Oshkosh, Wis., 27 Jul.-2 Aug., 2004
39. Ferman, M. A., "Use of Torsion Bars for Control of Twist, Air Loads, and Aeroelasticity of Fixed and Variable Geometry Rhomboid Wings," 9th International Conference on Recent Advances in Structural Dynamics, University of Southampton, ISVR, Southampton, UK, 17-19 Jul. 2006
40. Ferman, M. A., "Device and Method of Control of Fixed and Variable Geometry Rhomboid Wings," U.S. Pat. No. 7,131,611, November 2006.
41. Aguilar, E., "Aeroelastic Analyses and Wind Tunnel Tests of A Rhomboid Joined Wing Model," M.S. Thesis, Parks College, Saint Louis University, St. Louis, Mo., May 2004
42. Aguilar, E. and Ferman, M. A., "Experimental and Analytical Studies of a Rhomboid Wing Flutter Model," EAA Air Venture 2004, Oshkosh, Wis., 27 Jul.-2 Aug., 2004
43. Ferman, M. A., and Aguilar, E., "Experimental and Analytical Flutter Studies of a Rhomboid Wing Flutter Model," 9th International Conference on Recent Advances in Structural Dynamics, ISVR, University of Southampton, Southampton, UK 17-19 Jul. 2006
44. Spera, D. A., "Wind Turbine Technology," ASME Publication, 1995
45. H. Barrio, "Comparative Power Study of HAWT with Aerodynamic Tip Modifications," MS thesis. Parks College, St Louis University, December 1995
46. "Evaluation of New Propeller Concepts for Wind Turbines," by Barrio, H., and Ferman, M., EAA Air Venture 2005, Oshkosh Wis., 25-31 Jul. 2005
47. Ayala, Alberto, "An Experimental Study of a Two degree of Freedom Propeller Whirl Flutter model," MS Thesis, Parks College, SLU, May 2004
48. "Experimental Studies of a Two Degree of Freedom Propeller Whirl Flutter Model," by Alberto Ayala, and M. A. Ferman, EAA Air Venture 2004, Oshkosh Wis., Jul. 27-Aug. 2, 2004

What is claimed is:

1. An apparatus comprising:
a hub, wherein the hub rotates about an axis; and
at least two delta blade systems, wherein each of the at least two delta blade systems: (i) extends outward radially from the hub, (ii) has a distal end with respect to the hub and a proximal end connecting to the hub, (iii) is spaced equidistant from each adjacent delta blade system, and (iv) comprises:
a leading blade, wherein the proximal end of the leading blade is connected to the hub;
a trailing blade, wherein the proximal end of the trailing blade is connected to the hub;
a spherical joint, wherein the distal end of the leading blade is connected to the distal end of the trailing blade via the spherical joint, wherein, relative to the hub, the proximal end of the leading blade can be moved to any position along an arc, wherein the arc is concentric with the perimeter of the hub, and wherein an angle is formed by the leading blade and a line tangential to the arc at the intersection of the leading blade and the arc, and the angle is variable within the range of 90 degrees to 180 degrees to affect a change in sweep and aspect ratio of each of the at least two delta blade systems; and
a torsion bar system comprising one or more torsion bars, wherein a proximal end of the one or more torsion bars is connected to the hub and a distal end of the one or more torsion bars is connected to the spherical joint, wherein the torsion bar system is operably connected to at least one of the leading blade or the trailing blade to rotate the at least one of the leading blade or the trailing blade through a plurality of attack angles, and wherein the torsion bar system is operably rotated when a torque is applied to the torsion bar system.

2. The apparatus of claim 1, wherein the torsion bar system of each delta blade system comprises a single torsion bar connected to the hub at the proximal end of the torsion bar and connected to the spherical joint at the distal end of the torsion bar.

3. The apparatus of claim 1, wherein at least one of the one or more torsion bars of the torsion bar system is located within the leading blade.

4. The apparatus of claim 1, wherein at least one of the one or more torsion bars of the torsion bar system is located within the trailing blade.

5. The apparatus of claim 1, wherein at least one of the one or more torsion bars of the torsion bar system is located within the leading blade and at least a second of the one or more torsion bars of the torsion bar system is located within the trailing blade.

6. The apparatus of claim 1, wherein each of the one or more torsion bars is operably rotated by a torque applied to each of the respective one or more torsion bars.

7. The apparatus of claim 1, wherein at least two of the one or more torsion bars are concentric.

8. The apparatus of claim 1, wherein in each of the at least two delta blade systems the leading blade or the trailing blade or both further comprises one or more spars.

9. The apparatus of claim 1, wherein at least one of the one or more torsion bars further comprises a spherical bearing.

10. The apparatus of claim 1, wherein the torque applied to the torsion bar system is generated by at least one servo or at least one hydraulic actuator or both.

11. An apparatus comprising:
a hub, wherein the hub rotates about an axis; and
at least two delta blade systems, wherein each of the at least two delta blade systems: (i) extends outward radially from the hub, (ii) has a distal end with respect to the hub and a proximal end connecting to the hub, (iii) is spaced equidistant from each adjacent delta blade system, and (iv) comprises:
a leading blade, wherein the proximal end of the leading blade is connected to the hub;
a trailing blade, wherein the proximal end of the trailing blade is connected to the hub;
a spherical joint, wherein the distal end of the leading blade is connected to the distal end of the trailing blade via the spherical joint, wherein, relative to the hub, the proximal end of the trailing blade can be moved to any position along an arc, wherein the arc is concentric with the perimeter of the hub, and wherein an angle is formed by the trailing blade and a line tangential to the arc at the intersection of the trailing blade and the arc, and the angle is variable within the range of 90 degrees to 180 degrees to affect a change in sweep and aspect ratio of each of the at least two delta blade systems; and
a torsion bar system comprising one or more torsion bars, wherein a proximal end of the one or more torsion bars is connected to the hub and a distal end of the one or more torsion bars is connected to the spherical joint, wherein the torsion bar system is operably connected to at least one of the leading blade or the trailing blade to rotate the at least one of the leading blade or the trailing blade through a plurality of attack angles, and wherein the torsion bar system is operably rotated when a torque is applied to the torsion bar system.

12. An apparatus comprising:

a hub, wherein the hub rotates about an axis; and at least two delta blade systems, wherein each of the at least two delta blade systems: (i) extends outward radially from the hub, (ii) has a distal end with respect to the hub and a proximal end connecting to the hub, (iii) is spaced equidistant from each adjacent delta blade system, and (iv) comprises:

a leading blade, wherein the proximal end of the leading blade is connected to the hub;

a trailing blade, wherein the proximal end of the trailing blade is connected to the hub;

a spherical joint, wherein the distal end of the leading blade is connected to the distal end of the trailing blade via the spherical joint, wherein, relative to the hub, the proximal end of the leading blade can be moved to any position along a first arc, wherein the first arc is concentric with the perimeter of the hub, and wherein an angle is formed by the leading blade and a line tangential to the arc at the intersection of the leading blade and the arc, and the angle is variable within the range of 90 degrees to 180 degrees, and wherein the proximal end of the trailing blade can be moved to any position along a second arc, wherein the second arc is concentric with the perimeter of the hub, and wherein an angle is formed by the trailing blade and a line tangential to the arc at the intersection of the trailing blade and the arc, and the angle is variable within the range of 90 degrees to 180 degrees to affect a change in sweep and aspect ratio of each of the at least two delta blade systems; and a torsion bar system comprising one or more torsion bars, wherein a proximal end of the one or more torsion bars is connected to the hub and a distal end of the one or more torsion bars is connected to the spherical joint, wherein the torsion bar system is operably connected to at least one of the leading blade or the trailing blade to rotate the at least one of the leading blade or the trailing blade through a plurality of attack angles, and wherein the torsion bar system is operably rotated when a torque is applied to the torsion bar system.

13. A method of controlling an apparatus including a hub, wherein the hub rotates about an axis, and at least two delta blade systems, wherein each of the at least two delta blade systems: (i) extends outward radially from the hub, (ii) has a distal end with respect to the hub and a proximal end connecting to the hub, (iii) is spaced equidistant from each adjacent delta blade system, and each delta blade system includes a leading blade, wherein the proximal end of the leading blade is connected to the hub, a trailing blade, wherein the proximal end of the trailing blade is connected to the hub, a spherical joint, wherein the distal end of the leading blade is connected to the distal end of the trailing blade via the spherical joint, and a torsion bar system comprising one or more torsion bars, wherein a proximal end of the one or more torsion bars is connected to the hub and a distal end of the one or more torsion bars is connected to the spherical joint, wherein the torsion bar system is operably connected to at least one of the leading blade or the trailing blade to rotate the at least one of the leading blade or the trailing blade through a plurality of attack angles, and wherein the torsion bar system is operably rotated when a torque is applied to the torsion bar system, the method comprising:

applying at least one torque to at least one torsion bar to adjust the angle of attack of the leading blade or the trailing blade or both, wherein the angle of attack is adjusted based on wind speed or rotational frequency or both; and applying a force to the proximal end of the leading blade or the trailing blade or both, wherein relative to the hub, the proximal end of the leading blade or the trailing blade or both is moved to any position along an arc, wherein the arc is concentric with the perimeter of the hub, and wherein an angle formed by the leading blade or the trailing blade or both and the perimeter of the hub is variable within the range of 90 degrees to 180 degrees to affect a change in sweep and aspect ratio of each of the at least two delta blade systems.

14. A method of claim 13, comprising: applying at least one torque to the proximal end of at least one torsion bar.

* * * * *